US006985470B1

(12) United States Patent
Räsänen

(10) Patent No.: US 6,985,470 B1
(45) Date of Patent: Jan. 10, 2006

(54) DATA TRANSMISSION IN A TELECOMMUNICATION SYSTEM

(75) Inventor: Juha Räsänen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/762,228

(22) PCT Filed: Aug. 9, 1999

(86) PCT No.: PCT/FI99/00660

§ 371 (c)(1),
(2), (4) Date: Feb. 5, 2001

(87) PCT Pub. No.: WO00/10347

PCT Pub. Date: Feb. 24, 2000

(30) Foreign Application Priority Data

Aug. 10, 1998 (FI) .................................. 981723 U

(51) Int. Cl.
*H04Q 7/28* (2006.01)
(52) U.S. Cl. ...................... 370/341; 370/342; 370/344; 370/345; 370/503; 370/537
(58) Field of Classification Search ................ 370/342, 370/347, 437, 468, 207, 252, 329, 466, 216, 370/310, 313, 315, 327, 328, 330, 335, 336, 370/340, 341–345, 350, 503, 537; 455/427, 455/343.4
See application file for complete search history.

(56) References Cited

U.S. PATENT DOCUMENTS

| 5,570,362 | A | | 10/1996 | Nishimura |
| 5,648,955 | A | * | 7/1997 | Jensen et al. ................ 370/252 |
| 5,678,227 | A | * | 10/1997 | Connell et al. ........... 455/343.4 |
| 5,732,076 | A | * | 3/1998 | Ketseoglou et al. ........ 370/347 |
| 5,742,592 | A | | 4/1998 | Scholefield et al. |
| 5,870,427 | A | * | 2/1999 | Tiedemann et al. ......... 375/216 |
| 5,974,314 | A | * | 10/1999 | Hudson ...................... 455/427 |
| 6,078,631 | A | * | 6/2000 | Yabe et al. ................ 340/7.34 |
| 6,298,036 | B1 | * | 10/2001 | Kaku et al. ................. 370/207 |
| 6,473,438 | B1 | * | 10/2002 | Cioffi et al. ................ 370/468 |
| 6,477,177 | B1 | * | 11/2002 | Potts ......................... 370/437 |

FOREIGN PATENT DOCUMENTS

| WO | WO 96/27960 | 9/1996 |
| WO | 0 794 680 | 9/1997 |

OTHER PUBLICATIONS

Patent Abstract of Japan, abstract of JP 9-46355 A (NEC CORP), Feb. 14, 1997.

* cited by examiner

*Primary Examiner*—Phirin Sam
*Assistant Examiner*—Anthony Ton
(74) *Attorney, Agent, or Firm*—Pillsbury Winthrop Shaw Pittman LLP

(57) ABSTRACT

The invention relates to data transmission in a telecommunication system. An information unit is asynchronously transmitted over a transmission link, such as a radio interface, in timing units called radio frames. Information units reside in successive radio frames, each radio frame includes at least one whole information unit and part of an information unit split in successive radio frames. Thus, the frames contain asynchronous information units. One or more bits in a radio frame is reserved for phase indication, based on which a receiver synchronizes to the asynchronous information units. Phase indication defines a sequence of N successive radio frames and indicates for each frame which of the N possible frames in the sequences said frame is. The receiving unit indicates phasing between the frames and the asynchronous information units in the frames by synchronizing to said phase indication.

6 Claims, 2 Drawing Sheets

Figure 1A:
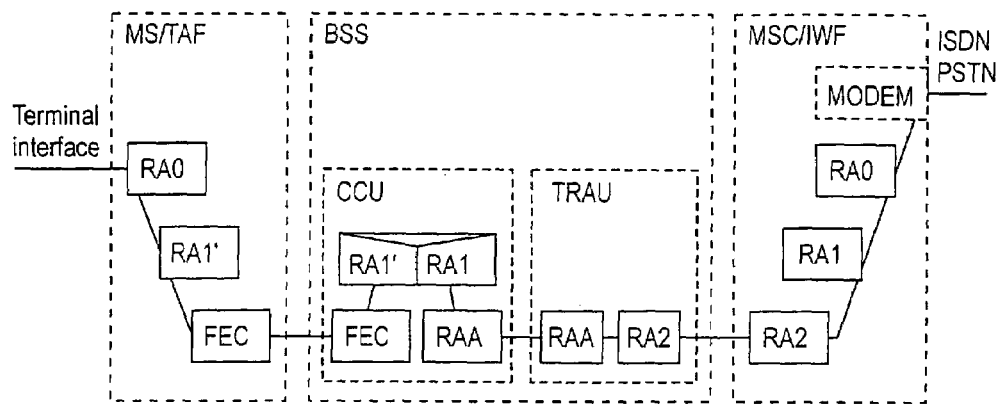

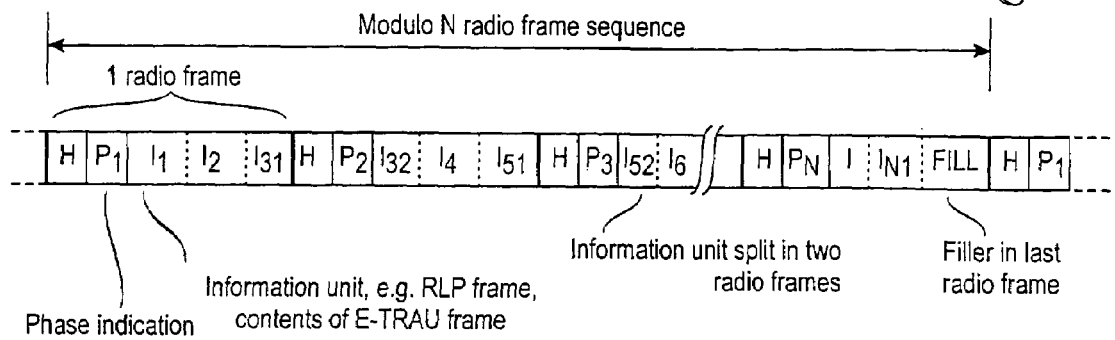
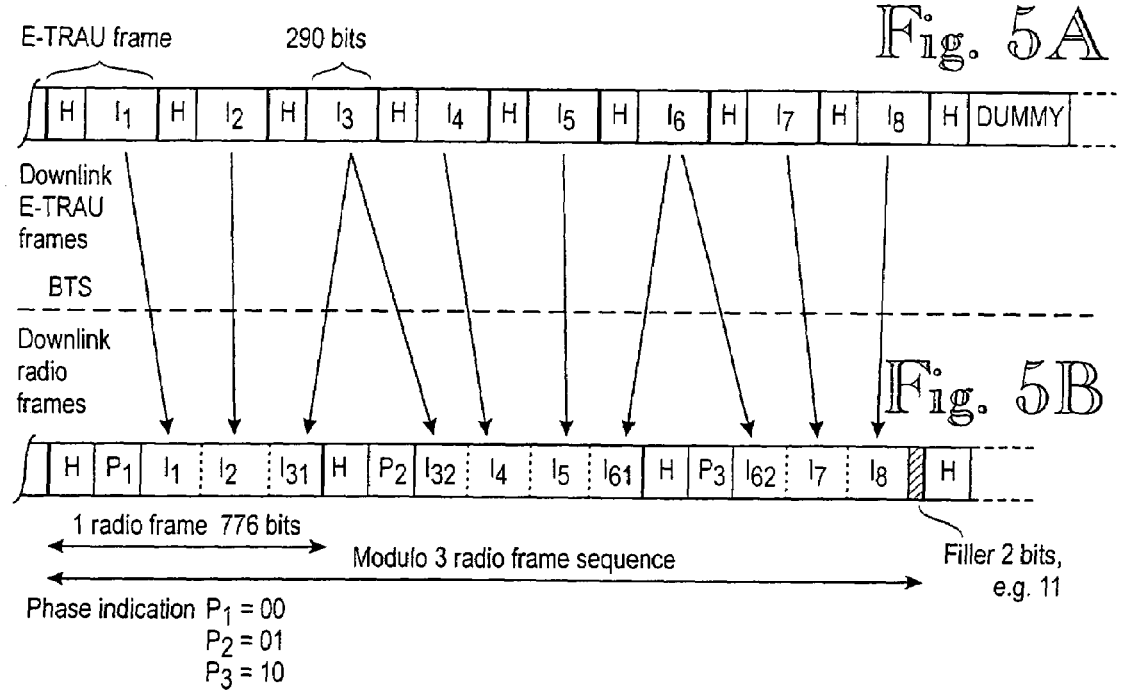
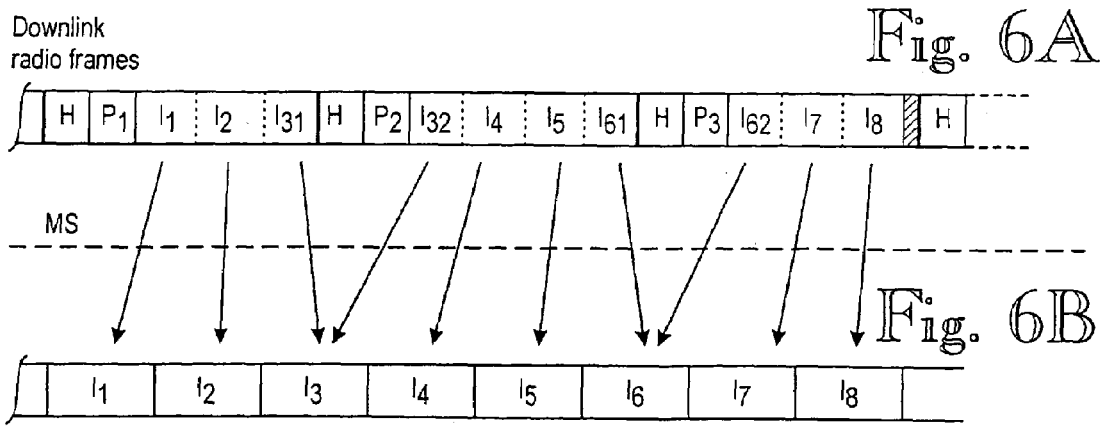

DATA TRANSMISSION IN A TELECOMMUNICATION SYSTEM

This application is the national phase of international application PCT/FI99/00660 filed Aug. 9, 1999 which designated the U.S.

The invention relates to data transmission in a telecommunication system.

In mobile communication systems, the data transmission capacity available at the radio interface is divided among a plurality of users by a multiple access principle. The most common multiple access principles include time division multiple access (TDMA), code division multiple access (CDMA), and frequency division multiple access (FDMA). In TDMA systems, communication on the radio path is time divided and occurs in successive repetitive TDMA frames, each of which comprises a plurality of timeslots. In each time-slot, a short information packet is sent as a finite radio frequency burst composed of a group of modulated bits. Timeslots are mainly used to transmit control channels and traffic channels. Speech and data are transmitted on traffic channels. Control channels are used for signalling between a base station and mobile stations. An example of a TDMA radio system is the pan-European mobile communication system GSM (Global System for Mobile Communications).

In the CDMA system, in turn, a traffic channel is defined by a unique spreading code assigned to a mobile station, whereas in the FDMA system, a traffic channel is defined by a radio channel.

The maximum data transfer rate on a traffic channel is relatively low, as it is limited by the available bandwidth and the channel and error codings used in the transmission. For instance in the GSM system (Global System for Mobile Communications), the user data rate in a traffic channel using one timeslot was restricted to 9.6 kbit/s according to the original specifications, the radio interface rate being 12 kbit/s. This was found to be insufficient for many new teleservices, such as telefax, video image transfer, etc. This is why high-speed data transmission services based on what is known as a multiple channel technique are being introduced into new mobile communication systems. In the multiple channel technique, a mobile station is offered a higher bit rate and a wider bandwidth in the form of a plurality of parallel basic traffic channels (e.g. several timeslots). For instance in the GSM mobile communication system, a high-speed data service HSCSD (High Speed Circuit Switch Data) is defined in the ETSI (European Telecommunications Standards Institute) recommendations GSM 01.34, GSM 02.34 and GSM 03.34. In the HSCSD concept, a high-speed data signal is divided into separate data streams which are then transmitted via N sub-channels (N traffic channel/timeslots) at the radio interface, and similarly, in N sub-channels between a base station and a mobile switching centre (transcoder). Once the data streams are divided, they are carried in the sub-channels as if they were not interdependent, until they are again combined at the receiving end. However, logically these N sub-traffic channels belong to the same HSCSD link, i.e. they form one HSCSD traffic channel. The capacity of an HSCSD is thus as much as eight-fold with respect to the capacity of a basic traffic channel, and this leads to a significantly improved data transmission rate. At the radio interface, the GSM-HSCSD is able to support a radio interface rate of 96 kbit/s (8×12 kbit/s) and user rates of 76.8 kbit/s (8×9.6 kbit/s).

Digital mobile communication systems, particularly TDMA-based systems, such as GSM, employ radio system timing to synchronize data transmission over the air interface. For instance in the GSM, a basic timing unit is 20 milliseconds (ms). In a transparent circuit-switched data call, said 20-ms unit corresponds to four V.110 frames (in cases involving TCH/F9.6 or TCH/F4.8 or TCH/F2.4 channel coding) or one E-TRAU frame (in cases involving TCH/F14.4 channel coding). In a non-transparent call, said 20-ms unit corresponds to one radio link protocol (RLP) frame (in cases involving TCH/F9.6 or TCH/F4.8 or TCH/F2.4 channel coding) or one half of an RLP frame (in cases involving TCH/F14.4 channel coding). In the latter case, the halves of the RLP frame are separated by an indication bit.

The above-mentioned TCH/F14.4 channel coding was introduced into the GSM system later, when higher data transfer rates were needed. In non-transparent calls, TCH/F14.4 channel coding requires a new RLP protocol version since said 20-ms basic timing unit included more bits than previously and was therefore not compatible with the RLP frame length or its multiple. TCH/F14.4 also produced a rather rough remapping procedure, enabling swapping between TCH/F14.4 and TCH/F9.6 channel coding during a data call. A reason for said swapping function is e.g. connection optimization after a change in radio link quality, or handover between two cells, one of which supports TCH/F14.4 channel coding and the other not. For a transparent 14.4 kbit/s call, the new TCH/F14.4 channel coding provided an extremely well optimized rate adaptation: a 14.5 kbit/s radio interface rate, of which 14.4 kbit/s is user data, adapted to the new number of bits in the 20-ms basic timing.

If new channel codings are introduced into the GSM, the same problem again arises as in TCH/F14.4: each channel coding has a different number of bits in one basic 20-ms timing unit. Some channel codings may produce a number of bits which is compatible with current rate adaptation frames or multiples of RLP frames, other channel codings may produce a number of bits requiring new RLP versions or new rate adaptation methods, whereas some channel codings may produce a number of bits which supports the use of current rate adaptation methods only very inefficiently, that is, with significant overhead.

Furthermore, the ETSI EDGE project (Enhanced Data Rates for GSM Evolution) is developing a new modulation method offering a higher data transfer rate per timeslot than the present GMSK modulation, but maintaining the 200-khz channel spacing and the TDMA frame structure. This allows the present HSCSD data services to be supported by a smaller number of timeslots. In addition, the new modulation allows the production of new data services having as high as a 64 kbit/s data transfer rate per timeslot or over 64 kbit/s (n*64 kbit/s) in a multiple timeslot constellation. The radio interface rate is either 28.8 kbit/s or 38.4 kbit/s. New channel codings causing the above problems are also produced with the new modulation method.

Similar problems arise also in other digital mobile communication systems and generally in telecommunication systems.

Consequently, there is a need for a general method for adapting fixed-length transmission frames to a timing unit (block) having any number of bits in a transmission channel, i.e. the same transmission frames can be sent through the system by different channel codings, avoiding the definition of new rate adaptations, link protocols and remapping procedures, and at the same time optimizing the efficiency of coding (overhead minimized).

The object of the invention is a method and system eliminating the above problems and achieving the objects.

This is achieved by the method of claim 1 and the mobile communication system.

In the invention, an information unit is asynchronously transmitted over a transmission link, such as a radio interface, in the basic timing units of the transmission link (such as a radio interface) called radio frames herein, in the case of a radio interface. The information units are placed in two or more successive radio frames in such a way that each radio frame contains at least one whole information unit and part of an information unit which is split in two successive radio frames. This way the radio frames may be considered to contain asynchronous information units. One or more bits in a radio frame are reserved for phase indication, on the basis of which a receiver synchronizes to the asynchronous information units within the radio frames. The phase indication is modulo N determining the sequence of N successive radio frames and indicating for each radio frame which of the N possible radio frames in the frame sequence said frame is. The transmitting unit packs the information units into radio frames and provides the radio frames with the above phase indication. As many whole information units as possible (at least one) are packed in the last radio frame of the frame sequence, and the end of the last radio frame is filled with filler bits, if required. This is usually required since the number of bits required by the information units packed in the frame sequence and by said phase indication is smaller than the total number of information bits in the frame sequence. This is typically the case in the primary application areas of the invention, i.e. when the length of the information field of a radio frame is not the length or a multiple of the information unit to be transmitted. Filler bits can be located in the frame sequence in other locations than at the end of the last radio frame. The receiving unit indicates phasing between the radio frames and the asynchronous information units in the radio frames by synchronizing with said phase indication. In other words, the receiving unit detects from the phase indication where the start of the frame sequence and the start of each whole information unit in the radio frame is, and separates the information units from the radio frames for further processing. The receiving unit rejects any filler bits.

An information unit may be any protocol unit or frame or information element which is to be transmitted over the radio interface. It may be a transmission frame or a part thereof (contents) used in data transmission between a network element, such as a base station, and a network adapter in a radio access network, for example, such as A-TRAU or E-TRAU frames in the GSM system. The information unit may also be a protocol data unit of an upper protocol. An example of this is a protocol data unit, such as a radio link protocol (RLP) frame in the GSM system, of a link protocol established between a mobile station and a network adapter. The invention allows the same fixed-length information unit to be arranged in a radio frame having any number of bits, i.e. the same information units may be transmitted through the radio interface of the radio system with different channel codings. The only thing required is the selection of a suitable value for the N modulo N sequence and a suitable number of filler bits for each different radio frame type or channel coding. In other words, a radio system may have a dedicated modulo N sequence for different data transfer rates and channel codings. The invention allows the radio system to use the same information unit in different channel codings. The present invention may be applied to the transmission of current RLP frames and transparent rate adaptation frames through new EDGE channel codings, avoiding the need to determine new RLP versions, rate adaptation methods and remapping procedures.

The invention optimizes the efficiency of channel coding, since it causes very slight overhead in the system. Typically, phase indication reserves one bit or only some bits in a radio frame. Phase indication may be for example a pseudo-noise (PN) code spread over N radio frames. This is extremely efficient, since only one bit is needed in each radio frame. For example in the case of a 31-bit PN code, the maximum modulo sequence of the radio frames is 31 frames and the receiver has to receive five radio frames in order to synchronize to the sequence, i.e. to lock to the right phase, in order for the receiver to know which of the 31 frames is involved and, accordingly, where the starts of the information units are in each radio frame. If a radio frame has enough bits available for phase indication, phase indication may be for example a sequence number (0, 1, 2, 3 . . . ). In this case the receiver only has to receive one radio frame in order to synchronize to the frame sequence. Furthermore, if there are enough bits, phase indication may be coded to protect it against transmission errors which may occur in transmission over the radio path.

Figure 1B:
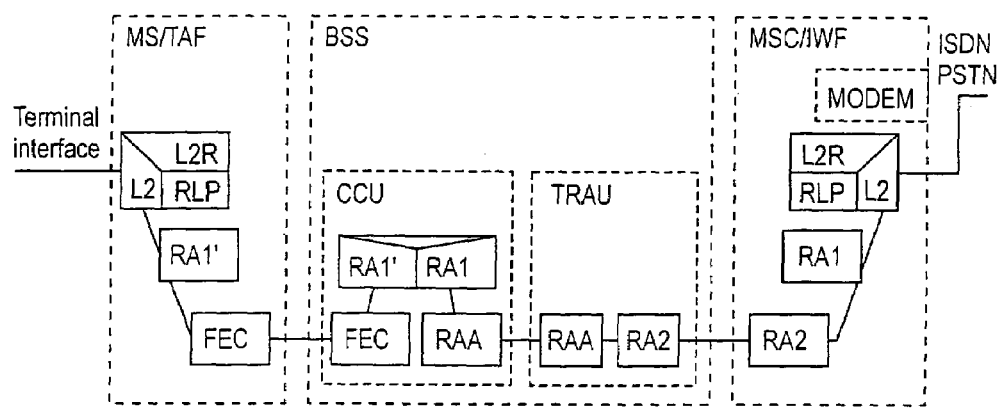
Figure 2:
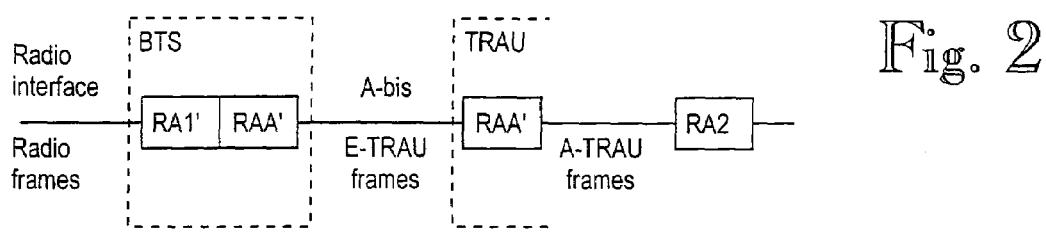
Figure 3:
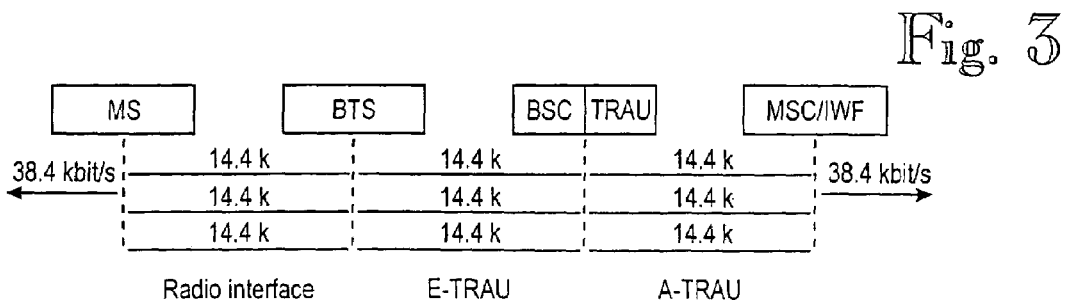

The invention will be described in more detail in connection with preferred embodiments with reference to the attached drawings, in which FIGS. 1A and 1B show a protocol structure for transparent and non-transparent traffic channels TCH/F4.8 and TCH/F9.6 in the GSM system, FIG. 2 shows Abis interface protocols for a traffic channel TCH/F14.4, FIG. 3 illustrates the channel configuration required by a 38.4 kbit/s EDGE traffic channel in the GSM, FIG. 4 shows a Modulo N radio frame sequence according to the invention, FIG. 5A illustrates downlink E-TRAU frames, FIGS. 5B and 6A illustrate the radio frame sequence of the invention for a 38.4 kbit/s EDGE traffic channel, FIG. 6B illustrates an information unit sequence which a mobile station separates from radio frames received.

The present invention may be applied in all digital telecommunication systems, and particularly in wireless telecommunication systems, such as cellular systems, WLL (Wireless Local Loop) and RLL (Radio Local Loop) type of networks, satellite-based mobile communication systems, etc., for the addition of a new high-speed traffic channel to the radio interface without any need to define new speed adaptations for transmission links. Herein the term mobile communication system (or network) refers generally to all wireless telecommunication systems. There are a plurality of multiple access modulation techniques which facilitate communication involving a large number of mobile users. These techniques include time division multiple access (TDMA), code division multiple access (CDMA) and frequency division multiple access (FDMA). The physical concept of a traffic channel varies in different multiple access systems, being primarily defined by means of a time slot in TDMA systems, by a spreading code in CDMA systems, by a radio channel in FDMA systems, a combination thereof, etc. The basic idea of the present invention is independent of the type of traffic channel and the multiple access methods used.

The primary application area of the invention is the addition of an EDGE radio interface to the GSM system or a corresponding change in other GSM-based systems, such as the DCS1800 (Digital Communication System), the US digital cellular system PSC (Personal Communication System), and WLL systems based on the above systems. The invention will be described by using the GSM mobile communication system as an example. The structure and operation of the GSM system are well known to persons skilled in the art and are defined in the ETSI (European Telecommunications Standards Institute) GSM specifications. A further reference is made to the publication *GSM System for Mobile Communication*, M. Mouly and M. Pautet, Palaiseau, France, 1992; ISBN: 2-9507190-0-7.

The basic structure of the GSM system comprises two parts: a base station system BSS and a network sub-system (NSS). The BSS and mobile stations MS communicate via radio links. A base station BTS serves each cell in the base station system BSS. A number of base stations are connected to a base station controller BSC, which controls the radio frequencies and channels the BTS uses. The BSCs are connected to a mobile services switching centre MSC. In addition, at least two data bases exist, a home location register HLR and a visitor location register VLR.

A mobile communication system typically comprises adapter functions for adapting the internal data link of the mobile communication network to the protocols used by the terminals and other telecommunication networks. Typical adapter functions include a terminal adaptation function (TAF) at the interface between a mobile station and a data terminal connected thereto, and a network adapter IWF (InterWorking Function) at the interface between the mobile communication network and a second telecommunication network, usually in connection with a mobile switching centre. A mobile switching centre usually has several types of adapter equipment pools for supporting different data services and protocols, e.g. a modem pool comprising modems and telefax adapters for modem and telefax services, a UDI/RDI speed adapter pool, etc. In the GSM system, a data link is established between the network terminal TAF of a mobile station MS and a network adapter IWF in the mobile communication system. The TAF adapts the data terminal DTE connected to the mobile station MS to said GSM data link which is set up over a physical connection using one or more traffic channels. The IWF connects the GSM data link to another network, such as the ISDN or a second GSM network, or the public telephone network PSTN.

As was explained above, modern mobile communication systems support different teleservices and network services. Network services are usually divided into groups according to a property, e.g. asynchronous network services and synchronous network services. Each group comprises a number of network services, such as transparent service (T) and non-transparent service (NT). In transparent service, the data to be transmitted is not structured and transmission errors are corrected only by channel coding. In non-transparent service, the data to be transmitted is structured into protocol data units (PDU) and transmission errors are corrected by using (in addition to channel coding) automatic retransmission protocols.

FIG. 1A shows an example of protocols and functions needed in the IWF (either in the MSC or a WLL-specific network element) for transparent network services. The transparent circuit-switched connection between the terminal adapter TAF and the network adapter IWF in a GSM traffic channel comprises a plurality of protocol layers which are common to all these services. These include different rate adaptation functions (RA), such as RA1' between a terminal adapter TAF and a CCU unit (Channel Codec Unit) in the base station system BSS, RA1 between a CCU unit and a network adapter IWF, RAA between a CCU unit and a transcoder unit TRAU which is separate from the base station, and RA2 between a transcoder unit TRAU and a network adapter IWF. The rate adaptation functions RA are defined in GSM recommendations 04.21 and 08.20. Traffic between a CCU unit and a transcoder unit TRAU is defined in GSM recommendation 08.60. At the radio interface, RA1' rate adapted information is also channel coded in a manner defined by GSM recommendation 5.03; blocks FEC illustrate this in a mobile station MS and a CCU unit. The IWF and the TAF also comprise upper layer protocols, which are service-specific. In the asynchronous transparent network service of FIG. 1A, the IWF requires an asynchronous/synchronous conversion of RA0 and a modem or a rate adapter towards the fixed network. A transparent signal propagates through a traffic channel between the terminal interface and the PSTN/ISDN. A transparent synchronous configuration is otherwise similar, but does not have the rate adaptation RA0.

Referring to FIG. 1B, in asynchronous non-transparent network service, the IWF and MS comprise, instead of RA0, L2R (Layer 2 Relay) and RLP (Radio Link Protocol) protocols. The L2R functionality for non-transparent character-oriented protocols is defined in GSM recommendation 07.02, for example. The RLP protocol is defined in GSM recommendation 04.22. The RLP is a frame-structured, balanced (HDLC type) data transmission protocol in which error correction is based on retransmission of distorted frames at the request of the receiving party. The interface between the IWF and an audio-modem MODEM, for example, conforms to CCITT V.24, and is denoted by symbol L2 in FIG. 1B. This non-transparent configuration is also used when accessing the Internet.

FIGS. 1A and 1B relate to a network configuration in which a transcoder and some rate adaptations are located outside the base station BTS in what is known as a remote transcoder TRAU. In this case the transcoder is considered to be a functional part of the BSC. Physically the TRAU may be located either in the BSC or the MSC. The interface between the transcoder unit TRAU and the base station BTS is called the Abis interface. The Abis interface comprises 16 kbit/s traffic channels, four of which can be transmitted in one standard 64 kbit/s channel. Information is transmitted between a channel codec unit CCU and a transcoder unit TRAU in fixed-length frames, called TRAU frames. Both speech/data and control signals associated with the transcoder TRAU are transmitted in these frames. In the case of 4.8 kbit/s (TCH/F4.8) and 9.6 kbit/s (TCH/F9.6) channel coding, when data is adapted into TRAU frames, the rate adaptation function RA1/RAA is required in addition to the other rate adaptations. When channel coding is 14.4 kbit/s (TCH/F14.4), a slightly different rate adaptation function, RA1'/RAA', is required, as FIG. 3 illustrates. RA1'/RAA' converts the radio frames (blocks) into E-TRAU format and vice versa. The RAA' function converts an E-TRAU frame into an A-TRAU frame and vice versa. Since the rate adaptation defined for TCH/F14.4 channel coding is also probably the best alternative for traffic channels at the EDGE radio interface, the primary embodiment of the invention will be described implemented thereby. However, it should be noted that the invention may also be implemented by other rate adaptations, such as RA1/RAA.

In the HSCSD concept of the GSM system, a high-speed data signal is divided into separate data streams which are then transmitted through an N sub-channel (N traffic channel/timeslots) at the radio interface and through an N transmission channel (16 kbit/s) between BTS/IWF. Once the data streams are divided, they are carried in the sub-channels as if they were not interdependent, until they are again combined in the IWF or the MS. However, logically these N sub-traffic channels belong to the same HSCSD link, i.e. they form one HSCSD traffic channel. According to the GSM recommendations, a data stream is divided and combined in a modified RA0 or RLP, which is hence common to all sub-channels. Underneath this common RA0 or RLP, each sub-channel has separately the same protocol stack RA1'-FEC-FEC-RA1'-RAA-RAA-RA2-RA2-RA1 or RA1'-FEC-FEC-RA1'-RAA'-RAA'-RA2-RA2-RA1, which is shown in FIGS. 1A and 1B for one traffic channel between MS/TAF and MSC/IWF. In transparent data transmission between TAF/IWF, traffic channels are numbered to maintain the order of the data. In addition, inside a traffic channel, multiframing is used to increase the tolerance against transmission delay errors between traffic channels. Channel and frame numbering is carried as inband signalling.

When attempts are made to support the EDGE radio interface rate 38.4 kbit/s by current channel structures and TCH/F1.4 rate adaptations between BTS/IWF, the result is a configuration according to FIG. 3. The EDGE channel 38.4 kbit/s requires three parallel 14.4 kbit/s channels between MS and MSC/IWF. When a 38.4 kbit/s EDGE channel is used, total transmission rates at the radio interface and the network interface are not equal. Furthermore, a new channel coding is required at the radio interface. This leads to the above problems associated with rate adaptations and RLP protocols and the efficiency of channel coding.

The following presents the inventor's analysis of some applications of the 38.4 kbit/s user rate, which could be alternatives to the present invention, and some problems associated therewith.

If TCH/F9.6 rate adaptation were used with V.110 frames, the radio interface rate would be 48 kbit/s because of the V.110 overhead. This would signify weak channel coding since the gross rate of the selected EDGE modulation method is 69.2 kbit/s. The radio interface rate should be as close as possible to the 38.4 kbit/s user rate to result in better channel coding.

The use of a more efficient A-TRAU or E-TRAU rate adaptation, defined for TCH/F14.4 channel coding (radio interface rate being 14.5 kbit/s), would support user data rates which are multiples of 14.4 kbit/s. This way a channel coding which would carry 3*14.5 kbit/s, i.e. 43.5 kbit/s, could be defined, corresponding to a user data rate of 43.2 kbit/s. However, this would still not be optimal in view of channel coding. In this approach, to achieve a (transparent) user data rate of exactly 38.4 kbit/s would require padding in radio frames.

A third way would be to define a suitable new rate adaptation and a new RLP version by new remapping operations to an optimized channel coding (at for example a 39 kbit/s radio interface rate). This would require much specification and implementation work. Furthermore, this is against EDGE standardization which aims at using current protocols with a minimal number of changes.

These problems can be avoided by the present invention whose basic principle is illustrated in FIG. 4.

In the invention, radio frames are provided with phase indication $P_1 \ldots P_n$ defining a sequence of N radio frames. In other words, in each frame, the phase indication $P_1 \ldots P_n$ indicates which of the N possible frames in the frame sequence the frame concerned is. A transmitting unit packs the information units $I_1 \ldots I_n$ in radio frames and provides the radio frames with the above phase indication P. Typically, the length of an information unit is shorter than the length of the information field in a radio frame, whereby the number N of information units is also higher than the number of radio frames in N sequences. This way each radio frame contains at least one whole information unit I (such as information units I1, I2, I4, I6 and $I_{N1}$) and part of an information unit split in two successive radio frames (such as $I_{51}$ and $I_{52}$, split from one whole information unit $I_5$ in two radio frames). As many whole information units as possible are packed in the last radio frame N of the frame sequence and the rest of the last radio frame is filled with filler bits FILL, if necessary. The modulo N radio frame sequence forms a kind of a multiframe in which phase indication $P_1$ acts as synchronization information.

In the following, a potential implementation of the 38.4 kbit/s user rate will be described as a primary embodiment, following the principles of the present invention and referring to FIGS. 5A, 5B, 6A and 68. The new functionality introduced by the invention is located for instance in blocks RA1' and RA1'/RAA' in the mobile station MS and the base station BTS in FIGS. 1A, 1B and 2.

As was stated above with reference to FIG. 3, a 38.4 kbit/s user rate can be carried in A-TRAU and E-TRAU frames defined for TCH/F14.4 channel coding between the network adapter MSC/IWF and the base station BTS using three Abis interface 16 kbit/s traffic channels, each of which has 14.4 kbit/s rate adaptation. For the rates of the radio interface and the transmission link to be compatible, every ninth A-TRAU and E-TRAU frame is a dummy frame. The PTS and IWF add the dummy frames in transmission and reject them in reception.

FIG. 5A illustrates a group of nine E-TRAU frames, eight of which have information contents $I_1 \ldots I_8$ and one of which is a dummy frame DUMMY. In this case the corresponding user rate is 8/9*3*14.4 kbit/s=38.4 kbit/s, as was required. A corresponding information rate containing user data plus status and control etc. sent over the radio interface when operating with E-TRAU frames is 8/9*3*14.5 kbit/s=38.666 . . . kbit/s. An E-TRAU frame contains 290 information bits (14500 bit/s:50). The header field H illustrates header, control, synchronization and other information associated with an E-TRAU frame.

FIG. 5B illustrates downlink radio frames which the BTS sends over the radio interface to the mobile station MS. The header H generally represents all header, control, synchronization and other information in a radio frame. In addition to the header H, a radio frame must have enough bits for transmitting information payload. At least one bit of each 20-ms radio frame is required for the phase indication P1, P2, and P3 of the invention. This indicates a need for an at least 50-bits/s additional capacity. In other words, the required radio interface rate is at least 38.666+0.050= 38.71666 . . . kbit/s. This has to be rounded up in order to avoid the appearance of fractions of bits in a 20-ms radio frame. In this example, 38.800 kbit/s is chosen as the radio interface rate. A radio interface rate of 38.800 kbit/s corresponds to 776 information bits for each 20-ms radio frame (38800 bit/s:50). The relation of the number of information bits in a radio frame to the number of information bits in an E-TRAU frame is 776/290. This is slightly more than 8/3, i.e. three radio interface frames may carry the information of 8 E-TRAU frames and some extra bits.

In the exemplary case presented, a modulo 3 radio frame sequence for example, would be efficient. In this case three radio frames carry 3*776=2328 bits. Similarly, 8 E-TRAU frames carry 8*290=2320 bits. Consequently, a sequence of three radio frames has eight extra bits for other purposes (2328~2320 bits). In the example of FIG. 5B, a frame numbering in which two bits in each radio frame are used for frame indication, is selected as phase indication. Two bit locations in each sequence of three radio frames are extra and pading information has to be carried therein. In FIG. 5B, these filler bits (e.g. 11) are placed at the end of the last frame.

This way a sequence of three radio frames according to FIG. 5B is achieved, in which each frame contains phase indication P1=00, P2=01 and P3=10. The first radio frame contains the contents $I_1$, and $I_2$ of two whole E-TRAU frames and slightly more than two thirds $I_{31}$ of E-TRAU frame-$I_3$. The rest $I_{32}$ of the E-TRAU frame $I_3$ is placed in a second radio frame. In addition, the second radio frame contains the contents $I_4$ and $I_5$ of two whole E-TRAU frames and slightly more than a third of E-TRAU frame $I_6$. The remaining two thirds $I_{62}$ of E-TRAU frame $I_6$ are placed in a third radio frame. In addition, the third radio frame contains the contents $I_7$ and $I_8$ of two whole E-TRAU frames, and two filler bits. After this, a new modulo 3 radio frame sequence begins.

FIGS. 6A and 6B illustrate the downlink operation of a mobile station MS. The MS receives downlink radio frames (FIG. 6A), which are identical to those in FIG. 5B. Let us assume that the MS receives the first radio frame in a frame sequence. The MS inspects the phase indication field P1 in the radio frame to find out which radio frame in the frame sequence is involved and thereby where the information units start in the radio frame. The starting points of the information units may be stored for each frame of the MS frame sequence, e.g. P1=00: the first unit in bit position 3, the second unit in bit position 293, the third unit in bit position 583, etc. Consequently, since P1=00, the MS knows that the first frame in the frame sequence is involved. Thereby the MS also knows that the 290 bits following the phase indication field P1 contain the first whole information unit $I_1$, the following 290 bits contain the second whole information unit $I_2$ and the last 194 bits contain the third information unit. The MS then receives the following radio frame and analyzes the phase indication field P2. Since P2=01, the MS knows that the second radio frame of a modulo 3 frame sequence is involved. The MS then knows that the 96 bits following the phase indication field P2 contain part $I_{32}$ of an information unit, which is to be combined with part $I_3$, of the information unit received in the first radio frame. The MS carries out the combination and produces a whole information unit $I_3$. The 580 bits following part $I_{32}$ of the information unit contain a whole information unit $I_4$ and the following 290 bits contain a whole information unit $I_5$. The last hundred bits of the second frame contain part $I_{61}$ of an information unit. The MS then receives the third frame in the radio frame sequence and analyzes the phase indication field P3. Since P3=10, the MS knows that the third frame of the modulo 3 radio frame sequence is involved. In this case, the 190 bits immediately following the phase indication field P3 contain part $I_{62}$ of the sixth information unit, which should be combined with part $I_{61}$ received in the previous frame. The MS carries out the combination and produces a whole information unit $I_6$. The following 580 bits contain the seventh and eight whole information units $I_7$ and $I_8$. The MS rejects the last two bits of the radio frame, which are filler bits. This way the MS has restored a sequence of eight information units $I_1$ to $I_8$ for further processing. In normal operation, the next radio frame received by the mobile station MS is the first frame in the next modulo 3 frame sequence, whereby the above procedure is repeated.

The uplink procedure is reverse but otherwise identical to what was described above (in FIGS. 5A, 5B, 6A and 6B the arrows are changed in opposite directions). In other words, at each particular time the MS packs eight units of the information unit stream shown in FIG. 6B in the uplink radio frames shown in FIG. 6A and provides them with the phase indication of the invention. The base station BTS receives said uplink radio frames which are as shown in FIGS. 5B and 6A, and separates whole-information units from them in the same way as was described above for the mobile station MS in the downlink direction. The BTS packs the separated information units into contents of E-TRAU frames, whereby uplink E-TRAU frames according to FIG. 5A are obtained and sent to the network adapter IWF. Even though in FIGS. 5A, 5B, 6A and 6B, the information unit is the contents of an E-TRAU frame, the information unit may be composed of any information which is to be transmitted. In the GSM system, in non-transparent transmission this unit may be a frame in the radio link protocol (RLP). In transparent data transmission an information unit may be a V.110 frame or a group of several V.110 frames.

It is obvious to a person skilled in the art that as technology advances, the basic idea of the invention may be implemented in a variety of ways. The invention and its embodiments are therefore not restricted to the above examples, but may vary within the scope of the claims.

What is claimed is:

1. A data transmission method in a digital telecommunication system including a mobile station, a radio access network element, a network adapter, a radio interface using channel coding and radio frames between the mobile station and the radio access network element, and a network interface between the radio access network element and the network adapter, the method comprising:
   placing information units to be transmitted in radio frames of a lower protocol in the radio interface;
   transmitting the radio frames over the radio interface; and
   separating said information units from the radio frames received over the radio interface;
   wherein the placing of information units comprises:
      transmitting 38.4 kbit/s of user data in 14.4 kbit/s transmission frames via three 16 kbit/s channels at the network interface, every ninth transmission frame being a dummy frame;
      providing 20-ms radio frames with phase indication which is modulo N, wherein N>3;
      placing the information contents of N1 transmission frames in each modulo N radio frame sequence, wherein N1>8;
      placing filler bits at the end of the last radio frame N of each radio frame sequence; and
   wherein the method further comprises, at a reception end:
      identifying the phase of each modulo N radio frame sequence and the starting points of the transmission frames in the radio frames on the basis of said phase indication;
      separating N1 transmission frames from each radio frame sequence for further processing; and
      rejecting said filler bits.

2. The method of claim 1, wherein the phase indication includes either a pseudo-noise code spread over N radio frames or a sequence number.

3. The method of claim 1, further comprising coding the phase indication as protection against transmission errors.

4. The method of claim 1, further comprising:
adding one or more filler bits to the frame sequence if the bit number required by the N1 information units and phase indication is smaller than the total number of information bits in the modulo N frame sequence; and
rejecting the one or more filler bits at the reception end.

5. The method of claim 4, wherein the added one or more filler bits to the frame sequence is added at the end of the last frame.

6. The method of claim 1, wherein a remote transcoder unit is arranged between the radio access network element and the network adapter at the network interface, and the method further comprises:
using transmission frames of a first type between said element and the remote transcoder;
using transmission frames of a second type between the remote transcoder and the network adapter; and
converting the transmission frames of the first type into transmission frames of the second type in the remote transcoder.

* * * * *